United States Patent
Kono et al.

(10) Patent No.: US 11,561,786 B2
(45) Date of Patent: Jan. 24, 2023

(54) UPDATE MANAGEMENT DEVICE, UPDATE MANAGEMENT SYSTEM, AND UPDATE MANAGEMENT METHOD

(71) Applicant: Mitsubishi Electric Corporation, Tokyo (JP)

(72) Inventors: Takuya Kono, Tokyo (JP); Makoto Takeda, Kobe (JP); Yoshihisa Nakao, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/287,136

(22) PCT Filed: Dec. 4, 2018

(86) PCT No.: PCT/JP2018/044588
§ 371 (c)(1),
(2) Date: Apr. 21, 2021

(87) PCT Pub. No.: WO2020/115818
PCT Pub. Date: Jun. 11, 2020

(65) Prior Publication Data
US 2021/0389939 A1    Dec. 16, 2021

(51) Int. Cl.
G06F 8/65    (2018.01)
H04L 67/125    (2022.01)
H04L 67/00    (2022.01)

(52) U.S. Cl.
CPC .............. *G06F 8/65* (2013.01); *H04L 67/125* (2013.01); *H04L 67/34* (2013.01)

(58) Field of Classification Search
None
See application file for complete search history.

(56) References Cited

U.S. PATENT DOCUMENTS

| 10,437,680 B2 * | 10/2019 | Kito ........................ H04L 69/40 |
| 10,678,454 B2 * | 6/2020 | Sakurai ...................... G06F 8/65 |
| 2018/0018160 A1 | 1/2018 | Teraoka et al. |

(Continued)

FOREIGN PATENT DOCUMENTS

| JP | 2016-170740 A | 9/2016 |
| JP | 2018-18307 A | 2/2018 |

OTHER PUBLICATIONS

International Search Report for PCT/JP2018/044588 dated, Feb. 19, 2019 (PCT/ISA/210).

*Primary Examiner* — Marina Lee
(74) *Attorney, Agent, or Firm* — Sughrue Mion, PLLC; Richard C. Turner

(57) ABSTRACT

An update management device manages software update of a plurality of ECUs included in an in-vehicle network, the update management device including: an information acquiring unit for acquiring load information indicating a load of each of the plurality of ECUs, performance information indicating a performance of each of the plurality of ECUs, and configuration information indicating the configuration of the in-vehicle network; and an update setting unit for selecting a restoration execution ECU that executes a restoration process of update data from among the plurality of ECUs using the load information, the performance information, and the configuration information acquired by the information acquiring unit.

17 Claims, 14 Drawing Sheets

(56) References Cited

U.S. PATENT DOCUMENTS

2018/0246711 A1\* 8/2018 Kurosawa ................. G06F 8/65
2019/0034256 A1\* 1/2019 Fox ......................... G06F 8/654
2020/0034134 A1\* 1/2020 Jayaraman .............. H04W 4/02

\* cited by examiner

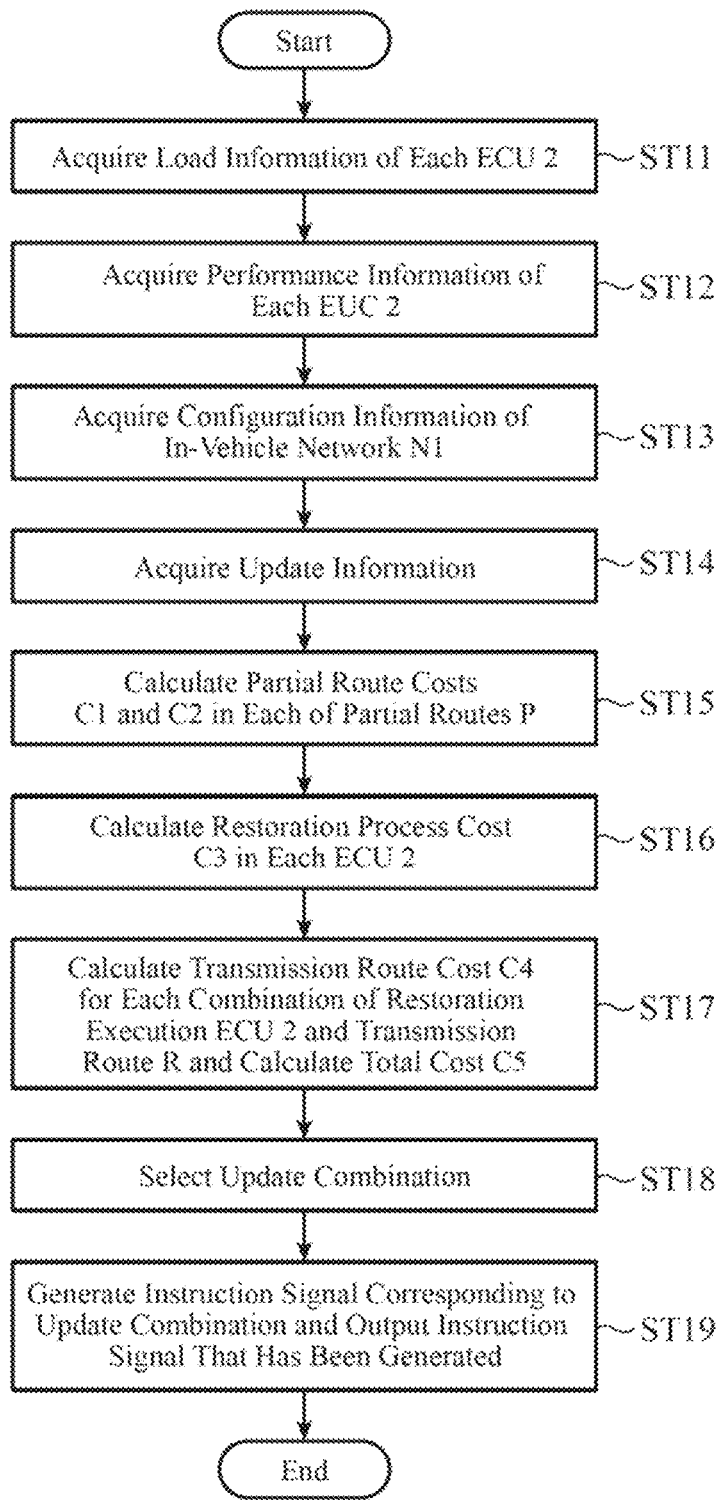

FIG. 7A

| Partial Route P | P_α | P_β | P_γ | P_δ | P_ε |
|---|---|---|---|---|---|
| First Partial Route Cost C1 | C1_α = 10 | C1_β = 8 | C1_γ = 80 | C1_δ = 40 | C1_ε = 60 |
| Second Partial Route Cost C2 | C2_α = 20 | C2_β = 16 | C2_γ = 160 | C2_δ = 80 | C2_ε = 120 |

FIG. 7B

| ECU2 | 2_1 | 2_2 | 2_3 | 2_4 | 2_5 |
|---|---|---|---|---|---|
| Restoration Process Cost C3 | C3_1 = 40 | C3_2 = 20 | C3_3 = 10 | C3_4 = 13 | C3_5 = 30 |

FIG. 7C

| Combination Number | Combination of Restoration Execution ECU 2 and Transmission Route R | | Restoration Process Cost C3 | Transmission Route Cost C4 (Calculation Formula of Transmission Route Cost C4) | Total Cost C5 |
|---|---|---|---|---|---|
| | Restoration Execution ECU 2 | Transmission Route R | | | |
| #1 | 2_1 | P_α→P_β→P_δ | C3_1 = 40 | C4 = 116 (C4 = C2_α + C2_β + C2_δ) | C5 = 156 |
| #2 | 2_2 | P_α→P_β→P_δ | C3_2 = 20 | C4 = 106 (C4 = C1_α + C2_β + C2_δ) | C5 = 126 |
| #3 | 2_3 | P_α→P_β→P_δ | C3_3 = 10 | C4 = 98 (C4 = C1_α + C1_β + C2_δ) | C5 = 108 |
| #4 | 2_4 | P_α→P_β→P_γ→P_δ | C3_4 = 13 | C4 = 218 (C4 = C1_α + C1_β + C1_γ + C2_δ) | C5 = 231 |
| #5 | 2_5 | P_α→P_β→P_δ | C3_5 = 30 | C4 = 58 (C4 = C1_α + C1_β + C1_δ) | C5 = 88 |
| ... | ... | ... | ... | ... | ... |

FIG. 8A

| Partial Route P | P_α | P_β | P_γ | P_δ | P_ε |
|---|---|---|---|---|---|
| First Partial Route Cost C1 | C1_α=10 | C1_β=8 | C1_γ=20 | C1_δ=90 | C1_ε=10 |
| Second Partial Route Cost C2 | C2_α=20 | C2_β=16 | C2_γ=40 | C2_δ=180 | C2_ε=20 |

FIG. 8B

| ECU2 | 2_1 | 2_2 | 2_3 | 2_4 | 2_5 |
|---|---|---|---|---|---|
| Restoration Process Cost C3 | C3_1=40 | C3_2=20 | C3_3=10 | C3_4=13 | C3_5=30 |

FIG. 8C

| Combination Number | Combination of Restoration Execution ECU 2 and Transmission Route R | | Restoration Process Cost C3 | Transmission Route Cost C4 (Calculation Formula of Transmission Route Cost C4) | Total Cost C5 |
|---|---|---|---|---|---|
| | Restoration Execution ECU2 | Transmission Route R | | | |
| #1 | 2_1 | P_α→P_β→P_γ→P_ε | C3_1=40 | C4=96 (C4=C2_α+C2_β+C2_γ+C2_ε) | C5=136 |
| #2 | 2_2 | P_α→P_β→P_γ→P_ε | C3_2=20 | C4=86 (C4=C1_α+C2_β+C2_γ+C2_ε) | C5=106 |
| #3 | 2_3 | P_α→P_β→P_γ→P_ε | C3_3=10 | C4=78 (C4=C1_α+C1_β+C2_γ+C2_ε) | C5=88 |
| #4 | 2_4 | P_α→P_β→P_γ→P_ε | C3_4=13 | C4=58 (C4=C1_α+C1_β+C1_γ+C2_ε) | C5=71 |
| #5 | 2_5 | P_α→P_β →P_γ→P_ε | C3_5=30 | C4=48 (C4=C1_α+C1_β+C1_γ+C1_ε) | C5=78 |
| ... | ... | ... | ... | ... | ... |

# UPDATE MANAGEMENT DEVICE, UPDATE MANAGEMENT SYSTEM, AND UPDATE MANAGEMENT METHOD

CROSS REFERENCE TO RELATED APPLICATIONS

This application is a National Stage of International Application No. PCT/JP2018/044588 filed Dec. 4, 2018.

TECHNICAL FIELD

The present invention relates to an update management device, an update management system, and an update management method.

BACKGROUND ART

In recent years, a plurality of electronic control units (hereinafter sometimes referred to as "ECUs") has been provided in a vehicle. Software of each ECU is updated by, for example, so-called "over-the-air (OTA)". Methods to update software by OTA include so-called "entire update" and "differential update". Patent Literature 1 discloses technology for identifying the update method when software of individual ECUs is updated by OTA.

CITATION LIST

Patent Literature

Patent Literature 1: JP2016-170740 A

SUMMARY OF INVENTION

Technical Problem

Generally, the performances of a plurality of ECUs in a vehicle are different from each other. The load of each of the plurality of ECUs fluctuates with time. Moreover, the configuration of ail in-vehicle network including the plurality of ECUs differs depending on, for example, the type of the vehicle.

In the related art, there is a problem that time required for update takes long when software of individual ECUs is updated by OTA since a low performance ECU or a high-load ECU among the plurality of ECUs, for example, restores update data. There is another problem that time required for the update takes longer when the update data is transmitted through a long route or a route having a low communication speed in the in-vehicle network.

The present invention has been made to solve the above problems, and an object of the present invention is to provide an update management device, an update management system, and an update management method capable of selecting an ECU that, for example, restores update data out of a plurality of ECUs depending on the load of each of the plurality of ECUs, the performance of each of the plurality of ECUs, and the configuration of an in-vehicle network including the plurality of ECUs.

Solution to Problem

An update management device of the present invention manages software update of a plurality of electronic control units included in an in-vehicle network, the update management device including: a processor to execute a program; and a memory to store the program which, when executed by the processor, performs processes of, acquiring load information indicating a load of each of the plurality of electronic control units, performance information indicating a performance of each of the plurality of electronic control units, and configuration information indicating a configuration of the in-vehicle network; and selecting a restoration execution electronic control unit that executes a restoration process of update data from among the plurality of electronic control units using the load information, the performance information, and the configuration information which are acquired.

Advantageous Effects of Invention

According to the present invention, with the configuration as described above, it is possible to select an ECU that, for example, restores update data out of a plurality of ECUs depending on the load of each of the plurality of ECUs, the performance of each of the plurality of ECUs, and the configuration of an in-vehicle network including the plurality of ECUs.

BRIEF DESCRIPTION OF DRAWINGS

FIG. 6 is a flowchart illustrating the operation of an update management device in the update management system according, to the first embodiment.

FIG. 7A is an explanatory table illustrating an example of partial route cost n each partial route. FIG. 7B is an explanatory table illustrating an example of restoration process cost in each of the ECUs. FIG. 7C is an explanatory table illustrating an example of transmission route cost and the total cost for each combination of a restorations execution ECU and a transmission route.

FIG. 8A is an explanatory table illustrating another example of partial route cost in each partial route. FIG. 8B is an explanatory table illustrating another example of restoration process cost in each of the ECUs. FIG. 8C is an explanatory table illustrating another example of transmission route cost and the total cost for each combination of a restoration execution ECU and a to route.

DESCRIPTION OF EMBODIMENTS

To describe the present invention further in detail, an embodiment for carrying out the present invention will be described below with reference to the accompanying drawings.

First Embodiment

Figure 1:
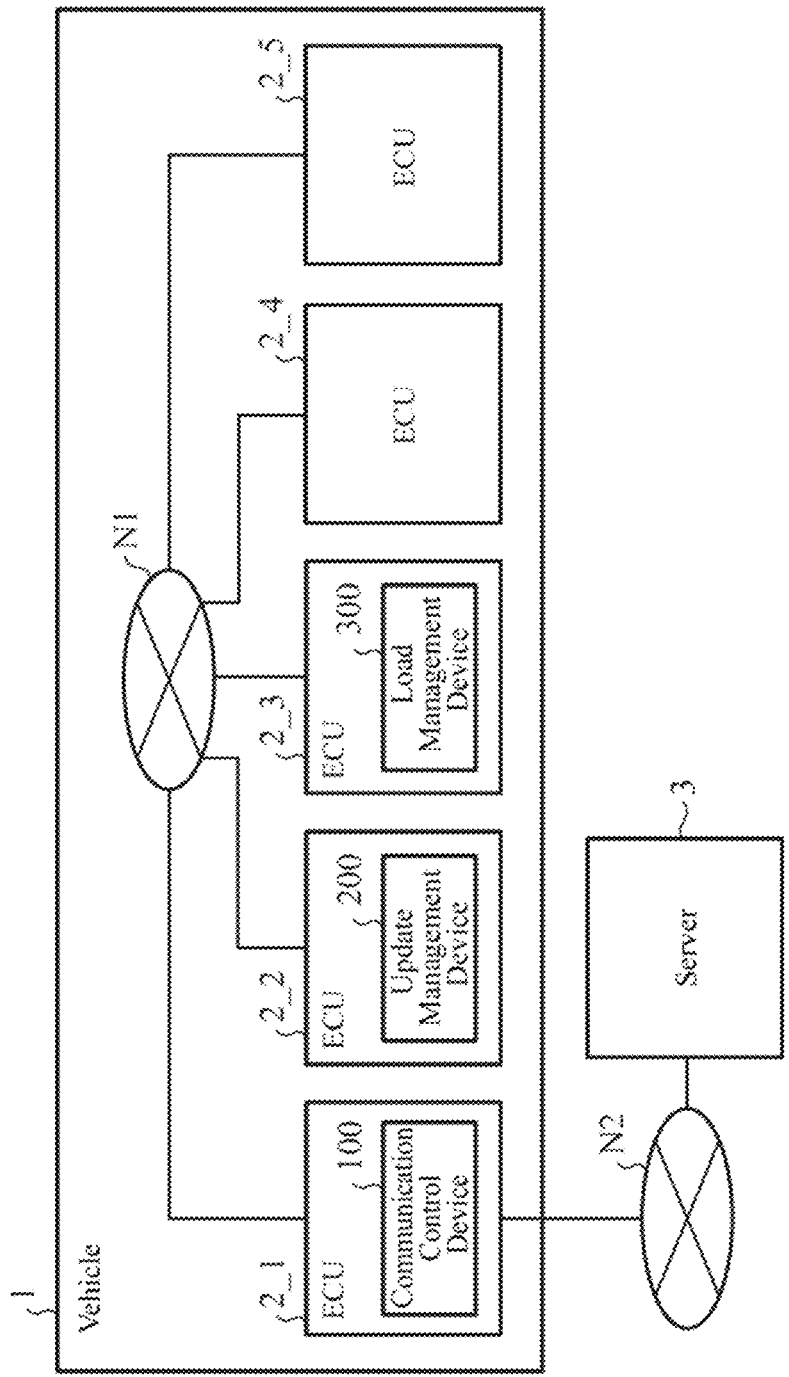
FIG. 1 is an explanatory diagram illustrating an example of a state in which a plurality of ECUs is provided in a vehicle.
Figure 2:
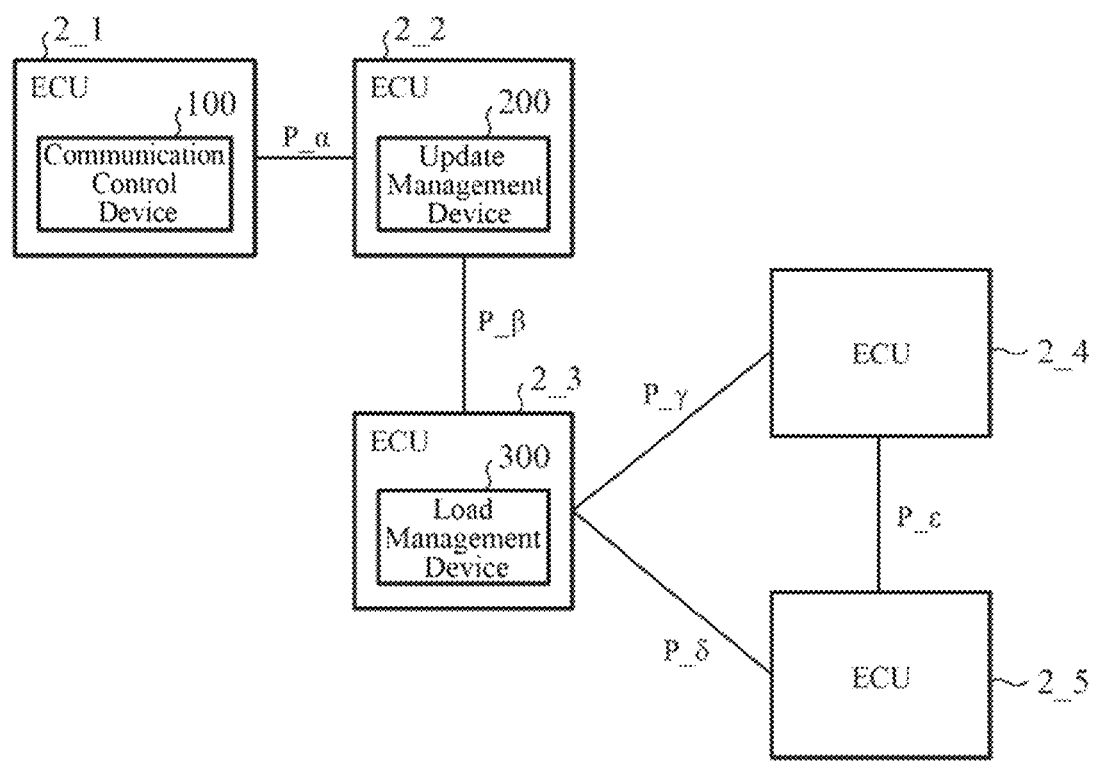
FIG. 2 is an explanatory diagram illustrating an example of the connection relationship among the plurality of ECUs in an in-vehicle network.
Figure 3:
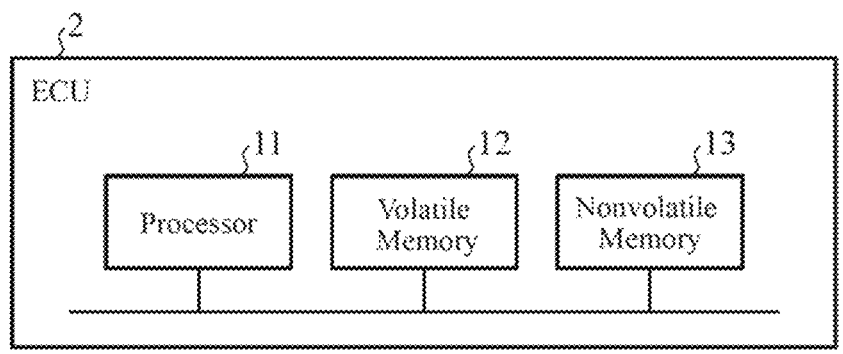
FIG. 3 is an explanatory diagram illustrating an example of a hardware configuration of each of the ECUs.

FIG. 1 is an explanatory diagram illustrating an example of a state in which a plurality of ECUs is provided in a vehicle. FIG. 2 is an explanatory diagram illustrating, an example of the connection relationship among the plurality of ECUs in at in-vehicle network. FIG. 3 is an explanatory diagram illustrating an example of a hardware configuration of each of the ECUs. A plurality of ECUs 2 will be described with reference to FIGS. 1 to 3.

As illustrated in FIG. 1, the plurality of ECUs 2 is provided in a vehicle 1. More specifically, five ECUs 2_1 to 2_5 are provided. The vehicle 1 also has an in-vehicle network N1.

Illustrated in FIG. 2 is an example of the connection relationship among the fie ECUs 2_1 to 2_5 in the in-vehicle network N1. As illustrated in FIG. 2 it is possible in the in-vehicle network N1 to perform direct communication between the ECUs 2_1 and 2_2, direct communication between the ECUs 2_2 and 2_3, direct communication between the ECUs 2_3 and 2_4, direct communication between the ECUs 2_3 and 2_5, and direct communication between the ECUs 2_4 and 2_5. On the other hand, it is not possible in the in-vehicle network N1 to perform direct communication between the ECUs 2_1 and 2_3, direct communication between the ECUs 2_1 and 2_4, direct communication between the ECUs 2_1 and 2_5, direct communication between the ECUs 2_2 and 2_4, and direct communication between the ECUs 2_2 and 2_5.

That is, the ECUs 2_1 and 2_3 can directly communicate with the ECU 2_2. Meanwhile, the ECUs 2_4 and 2_5 cannot communicate directly with the ECU 2_2 but can communicate directly with the ECU 2_3.

In the figure, symbol P_α represents the connection mute between the ECUs 2_1 and 2_2 in the in-vehicle network N1. Symbol P_β represents the connection route between the ECUs 2_2 and 2_3 in the in-vehicle network N1. Symbol P_γ represents the connection route between the ECUs 2_3 and 2_4 in the in-vehicle network N1. Symbol P_δ represents the connection route between the ECUs 2_3 and 2_5 the in-Vehicle network N1. Symbol P_ε represents the connection route between the ECUs 2_4 and 2_5 in the in-vehicle network N1. Hereinafter, these connection routes P are referred to as "partial routes". That is, the plurality of ECUs 2 can communicate freely with each other through the plurality of partial routes P.

Each of the ECUs 2 performs various functions in the corresponding type of control for the vehicle 1. Specifically, for example, each of the ECUs 2 performs various functions in the traveling control of the vehicle 1, the control of a telematics system for the vehicle 1, the control of a navigation system for the vehicle 1, or the control of an entertainment system for the vehicle 1.

FIG. 3 is a diagram illustrating a hardware configuration of the main part of each of the ECUs 2. As illustrated in FIG. 3, each of the ECUs 2 includes a processor 11, a volatile memory 12, and a non-volatile memory 13. The non-volatile memory 13 stores a program for implementing the function of a corresponding ECU 2, that is, software. With the processor 11 reading and executing the program stored in the non-volatile memory 13, the function of the corresponding ECU 2 is implemented. At this point, the volatile memory 12 functions as a so-called "working memory".

The processor 11 includes, for example, at least one of a central processing unit (CPU), a graphics processing unit (GPU), a microprocessor, a micro controller, or a digital signal processor (DSP).

The volatile memory 12 includes, for example, a random access memory (RAM).

The non-volatile memory 13 includes, for example, at least one of a read only memory (ROM), a flash memory, an erasable programmable read only memory (EPROM), an electrically erasable programmable read-only memory (EEPROM), solid state drive (SSD), or a hard disk drive (HDD).

Here, the ECU 2_1 functions as a communication control device 100. In addition, the ECU functions as an update management device 200. In addition, the ECU 2_3 functions as a load management device 300. An update management system 400 includes the update management device 200 and the load management device 300.

Hereinafter, an ECU 2 that functions as the communication control device 100 among the plurality of ECUs 2 may be referred to as a "communication control ECU". Moreover an ECU 2 that functions as the update management device 200 among the plurality of ECUs may be referred to as an "update management ECU". Furthermore, an ECU 2 that functions as the load management device 300 among the plurality of ECUs may be referred to as a "load management ECU".

The communication control device 100 controls communication between the vehicle 1 and a server 3 via an external network N2. More specifically, the communication control device 100 executes a process of receiving update data for software of each of the ECUs 2 from the server 3 and a process of receiving information regarding the update data (hereinafter referred to as "update information") from the server 3. The update information includes, for example, information indicating the size of update data and information indicating software to be updated by the update data (hereinafter, may be referred to as "update target software").

The processes of receiving the update data and the update information are executed, for example, in response to operation input to an operation input device (not illustrated) by a user. Alternatively, for example, the processes are executed in response to a notification from the server 3 to the communication control device 100.

Hereinafter, an ECU 2 to which the update data is to be applied among the plurality of ECUs 2, that is, an ECU 2 having the update target software, may be referred to as an "update target ECU". Incidentally, a process of, for example, restoring the update data (hereinafter referred to as "restoration process") is executed before a process of applying the update data to the update target ECU 2, that is, a process of updating the update target software (hereinafter referred to as "update process"). Hereinafter, an ECU 2 that executes the restoration process among the plurality of ECUs 2 may be referred to as a "restoration execution ECU". The restoration execution ECU may be the same. ECU 2 as the update target ECU or may be an ECU 2 that is different from the update target ECU.

Note that the update data may include data corresponding to the entire software after the update. That is, the update process may be an entire update.

Furthermore, the update data may include data corresponding to a difference between the software before the update and the software after the update. That is, the update process may be differential update. In this case, the restoration process may include a process of restoring data corresponding to the entire software after the update.

The update data may be compressed. In this case, the restoration process may include a process of decompressing the compressed update data.

Furthermore, the update data may be encrypted. In this case, the restoration process may include a process of decrypting the encrypted update data.

Figure 4:
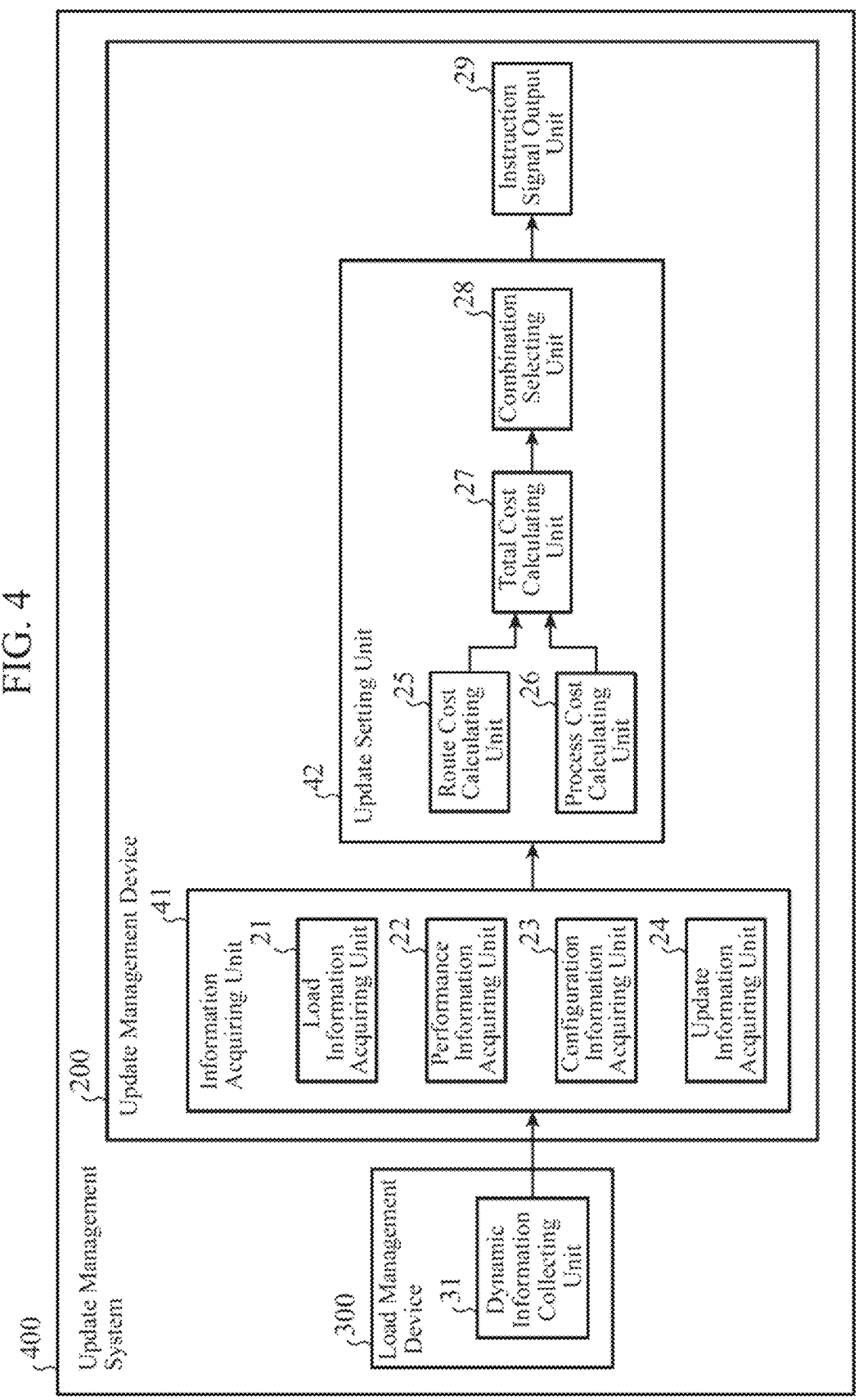
FIG. 4 is a block diagram illustrating the main part of an update management system according to a first embodiment.

FIG. 4 is a block diagram illustrating the main part of an update management system according to the first embodiment. The update management system 400 according to the first embodiment will be described by referring to FIGS. 1 to 4.

When the communication control device 100 receives update data and update information, the communication control device 100 notifies the update management device 200 of the reception. A load information acquiring non 21 acquires information indicating the load of each of the ECUs 2 (hereinafter referred to as "load information") when the notification (hereinafter referred to as a "reception notification") is made. A performance information acquiring unit 22 acquires information indicating the performance of each of the ECUs 2 (hereinafter referred to as "performance information") when the reception notification is made. When the reception notification is made, a configuration information acquiring unit 23 acquires information indicating the configuration of the in-vehicle network N1 (hereinafter referred to as "configuration information").

The load information includes, for example, information indicating the usage rate of the processor 11 in each of the ECUs 2 (hereinafter referred to as "processor usage rate information") and information indicating the usage rate of the volatile memory 12, in each of the ECUs 2 (hereinafter referred to as "memory usage rate information"), The performance information includes, for example, information indicating the processing speed of the processor 11 in each of the ECUs 2 (hereinafter referred to as "processing speed information"), information indicating the capacity of an area that is included in the non-volatile memory 13 in each of the ECUs 2 and that can be used for storing update data (hereinafter referred to as "storage capacity information"), and information indicating the capacity of the volatile memory 12 in each of the ECUs 2 (hereinafter referred to as "working capacity information"). The configuration information includes, for example, information indicating the connection relationship (so-called "topology") among the plurality of ECUs 2 in the in-vehicle network N1 (hereinafter referred to as "topology information") and information indicating the communication speed (so-called "bandwidth") assigned to each of the partial routes P (hereinafter referred to as "bandwidth information").

Here, the usage rate of the processor 11 in each of the ECUs 2 can change dynamically with time. Also, the usage rate of the volatile memory 12 in each of the ECUs 2 can also change dynamically with time. Furthermore, the capacity of an area that is included in the non-volatile memory 13 in each of the ECUs 2 and that can be used for storing update data can also change dynamically with time. Therefore, each of the processor usage rate information, the memory usage rate information, and the storage capacity information is so-called "dynamic information". Meanwhile, each of the processing speed information, the working capacity information, the topology information, and the bandwidth information is so-called "static information".

That is, the load information includes dynamic information. The performance information includes dynamic information and static information. The configuration information includes static information.

These pieces of static information are stored in advance in, for example, the non-volatile memory 13 of the update management ECU 2_2. The performance information acquiring unit 22 and the configuration information acquiring unit 23 acquire the stored static information from the non-volatile memory 13 of the update management ECU 2_2.

The load information acquiring unit 21 and the performance information acquiring unit 22 acquire pieces of dynamic information related to the ECUs 2_1, 2_2, and 2_3 from the ECUs 2_1, 2_2, and 2_3, respectively. That is the ECU 2_2 is an update management ECU. The ECUs 2_1 and 2_3 can directly communicate with the update management ECU 2_2.

On the other hand, the ECUs 2_4 and 2_5 cannot directly communicate with the update management ECU 2_2. Meanwhile, the ECUs 2_4 and 2_5 can directly communicate with the load management ECU 2_3. Therefore, the load management device 300 includes a dynamic information collecting unit 31 for periodically collecting dynamic information related to the ECUs 2_4 and 2_5. The load information acquiring unit 21 and the performance information acquiring unit 22 acquire the dynamic information collected by the dynamic information collecting unit 31 from the dynamic information collecting unit 31 when a reception notification is made by the communication control device 100. More specifically, the load information acquiring unit 21 and the performance information acquiring unit 22 acquire the latest dynamic information among the collected dynamic information from the dynamic information collecting unit 31. Hereinafter, an ECU 2 whose dynamic information is to be collected by the dynamic information collecting unit 31 among the plurality of ECUs 2 may be referred to as a "collection target ECU".

An update information acquiring unit 24 acquires the update information received by the communication control device 100 from the communication control device 100 when the reception notification is made by the communication control device 100.

An information acquiring unit 41 includes the load information acquiring unit 21, the performance information acquiring unit 22, the configuration information acquiring unit 23, and the update information acquiring unit 24.

A route cost calculating unit 25 calculates transmission cost (hereinafter referred to as "first partial route cost") C1 of update data before execution of the restoration process (hereinafter referred to as "update data before restoration") in each of the partial routes P using the configuration information and the update information acquired by the information acquiring unit 41. The route cost calculating unit 25 also calculates transmission cost (hereinafter referred to as "second partial route cost") C2 of the update data after the execution of the restoration process thereinafter referred to as "update data after restoration") in each of the partial routes P using the configuration information and the update information acquired by the information acquiring unit 41.

For example, as the first partial route cost C1, a larger value is calculated as the size of the update data before restoration is larger, and a larger value is calculated as the communication speed in the corresponding partial route P is lower. That is, as the first partial route cost C1, a larger value is calculated as the time required for transmission of the update data before restoration takes longer in the corresponding partial route P.

For example, as the second partial route cost C2, a larger value is calculated as the size of the update data after restoration is larger, and a larger value is calculated as the communication speed in the corresponding partial route P is lower. That is, as the second partial route cost C2, a larger value is calculated as the time required for transmission of the update data after restoration takes longer in the corresponding partial route P.

Usually, the size of the update data after restoration is larger than the size of the update data before restoration. Therefore, the second partial route cost C2 in each of the partial routes P is usually calculated to be a larger value than the first partial route cost C1 in the corresponding partial route P. Hereinafter, the first partial route cost C1 and the second partial route cost C2 may be collectively referred to simply as "partial route cost".

A process cost calculating unit 26 calculates execution cost C3 of the restoration process (hereinafter referred to as "restoration process cost") in each of the ECUs 2 using the load information, the performance information, and the update information acquired by the information acquiring unit 41.

As the restoration process cost C3, for example, a larger value is calculated as the usage rate of the processor 11 in the corresponding ECU 2 is higher, a larger value is calculated as the usage rate of the volatile memory 12 in the corresponding ECU 2 is higher, a larger value is calculated as the processing speed of the processor 11 in the corresponding ECU 2 is lower, a larger value is calculated as the capacity of an area that is included in the non-volatile memory 13 of the corresponding ECU 2 and that can be used to store update data is smaller, and a larger value is calculated as the capacity of the volatile memory 12 in the corresponding ECU 2 is smaller. That is as the restoration process cost C3, a larger value is calculated as it takes more time for execution of the restoration process in the corresponding ECU 2.

A total cost calculating unit 27 calculates, for each combination of a restoration execution ECU 2 and a transmission route R of the update data in the in-vehicle network N1, transmission cost C4 of the update data in the transmission route R (hereinafter referred to as "transmission route cost") on the basis of the partial route costs C1 and C2 calculated by the route cost calculating unit 25. Furthermore, the total cost calculating unit 27 calculates, for each combination of a restoration execution ECU 2 and a transmission route R, the total value C5 of the restoration process cost C3 and the transmission route cost C4 (hereinafter referred to as the "Total cost") on the basis of the restoration process cost C3 calculated by the process cost calculating unit 26 and the calculated transmission route cost C4.

A combination selecting unit 28 selects, out of combinations of a restoration execution ECU 2 and a transmission route R, a combination that is to be used for update of the update target software (hereinafter referred to as "update combination") on the basis of the total cost C5 calculated by the total cost calculating unit 27.

An update setting unit 42 includes the route cost calculating unit 25, the process cost calculating unit 26, the total cost calculating unit 27, and the combination selecting unit 28. That is, the update setting unit 42 selects a transmission route R to be used for update of the update target software and also selects the restoration execution ECU 2 to be used for the update, using, the load information, the performance information, the configuration information, and the update information acquired by the information acquiring unit 41.

Here, the above process by the update setting unit 42 is to solve a so-called "shortest path problem". That is, each of the ECUs 2 corresponds to a node in a shortest path problem, and each of the partial routes P corresponds to a link in the shortest path problem. The communication control ECU 2_1 corresponds to the start point in the shortest path problem, and an update target ECU 2 corresponds to the end point in the shortest path problem.

By solving, such a shortest path problem, it is possible to appropriately select the transmission route R to be used for update of the update target software and the restoration execution ECU 2 to be used for the update. More specifically, it is possible to shorten the total time of the time required for execution of the restoration process and the time required for transmission of the update data in the in-vehicle network N1. In other words, it is possible to shorten the time period from completion of reception of the update data and the update information to completion of the update of the update target software.

An instruction signal output unit 29 generates an instruction signal for each of the ECUs 2 depending on the update combination selected by the combination selecting unit 28. The instruction signal output unit 29 outputs the instruction signal that has been generated.

The update data is transmitted in the transmission route R that corresponds to the update combination on the basis of the instruction signal that has been output. At this point, a restoration process is executed in the restoration execution ECU 2 that corresponds to the update combination. After the transmission, as update process is executed in the update target ECU 2. As a result, the update target software is updated.

The main part of the update management device 200 includes the information acquiring unit 41, the update setting unit 42, and the instruction signal output unit 29. The main part of the load management device 100 includes the dynamic information collecting unit 31. The update management system 400 includes the update management device 200 and the load, management device 300.

Figure 5:
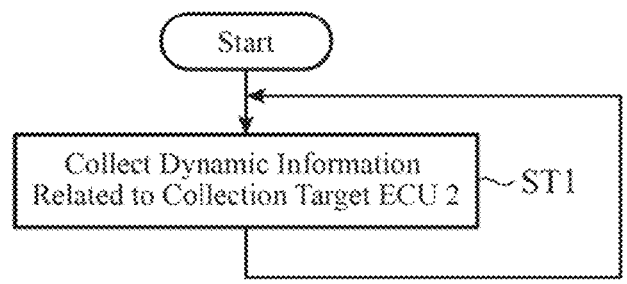
FIG. 5 is a flowchart illustrating the operation of a load management device in the update management system according to the first embodiment.

Next, the operation of the load management device 300 will be described with reference to the flowchart of FIG. 5, focusing on the operation of the dynamic information collecting unit 31.

In step ST1, the dynamic information collecting unit 31 collects dynamic information related to collection target ECUs 2_4 and 2_5. The dynamic information collecting unit 31 periodically executes the process of step ST1 when the power for the load management ECU 2_3 (for example, an accessory power supply or an ignition power supply of the vehicle 1) is turned on. That is, the dynamic information collecting unit 31 repeatedly executes the process of step ST1 at predetermined time intervals when the power is turned on.

Next, the operation of the update management device 200 will be described with reference to the flowchart of FIG. 6, focusing on the operation of the information acquiring unit 41, the update setting unit 42, and the instruction signal output unit 29. The update management device 200 starts the process of step ST11 when a reception notification is made by the communication control device 100.

First, in step ST11, the load information acquiring unit 21 acquires load information of each of the ECUs 2. At this point, the load information acquiring unit 21 acquires dynamic information related to the ECUs 2_1, 2_2, and 2_3 in the load information from the ECUs 2_1, 2_2, and 2_3, respectively. The load information acquiring unit 21 acquires dynamic information related to the ECUs 2_4 and 2_5 in the load information from the dynamic information collecting unit 31.

Next, in step ST12, the performance information acquiring unit 22 acquires performance information of each of the ECUs 2. At this point, the performance information acquiring unit 22 acquires static information in the performance information from the non-volatile memory 13 of the update management ECU 2_2. The performance information acquiring unit 22 also acquires dynamic information related to the ECUs 2_1 and 2_3 in the performance inti nation from the ECUs 2_1, 2_2, and 2_3, respectively. The performance information acquiring unit 22 further acquires dynamic information related to the ECUs 2_4 and 2_5 in the performance information from the dynamic information collecting unit 31.

Next, in step ST13, the configuration information acquiring unit 2 acquires configuration information of the in-vehicle network N1. At this point, the configuration information acquiring unit 23 acquires the configuration information (that is, static information) from the non-volatile memory 13 of the update management ECU 2_2.

Then, in step ST14, the update information acquiring unit 24 acquires, from the communication control device 100, update information that has been received by the communication control device 100.

Next, in step ST15, the route cost calculating unit 25 calculates partial route costs C1 and C2 in each of the partial routes P using the configuration information and the update information acquired by the information acquiring unit 41. Since specific examples of the calculation methods of the partial route costs C1 and C2 are as described above, redundant description will be omitted.

Then, in step ST16, the process cost calculating unit 26 calculates restoration process cost C3 in each of the ECUs 2 using the load information, the performance information, and the update information acquired by the information acquiring unit 41. Since a specific example of the calculation method of the restoration process cost C3 is as described above, redundant description will be omitted.

Next, in step ST17 the total cost calculating unit 27 calculates transmission route cost C4 for each combination of a restoration execution ECU 2 and a transmission route R on the basis of the partial route costs C1 and C2 calculated by the route cost calculating unit 25. The total cost calculating unit 27 calculates the total cost C5 for each combination of a restoration execution ECU 2 and a transmission route R on the basis of the restoration process cost C3 calculated by the process cost calculating unit 26 and the calculated transmission route cost C4. Since specific examples of the calculation method of the transmission route cost C4 and the calculation method of the total cost C5 are as described above, redundant description will be omitted.

Next, in step ST18, the combination selecting unit 28 selects an update combination out of combinations of a restoration execution ECU 2 and a transmission route R on the basis of the total cost CS calculated by the total cost calculating unit 27. More specifically, the combination selecting unit 28 selects a combination that has the smallest total cost C5 calculated by the total cost calculating unit 27 out of the combinations of a restoration execution ECU 2 and a transmission route R.

Next, in step ST19, the instruction signal output unit 29 generates an instruction signal for each of the ECUs 2 depending on the update combination selected by the combination selecting unit 28. The instruction signal output unit 29 outputs the instruction signal that has been generated.

Next, a specific example of the process by the update setting unit 42 will be described with reference to FIG. 7. Note that it is assumed that the update target ECU is the ECU 2_5.

First, the route cost calculating unit 25 calculates first partial route cost C1 in each of the partial routes P (step ST15). In FIG. 7A, illustrated is an example of first partial route costs $C1\_\alpha$, $C1\_\beta$, $C1\_\gamma$, $C1\_\delta$, and $C1\_\varepsilon$ calculated by the route cost calculating unit 25. Here, the first partial mite costs $C1\_\alpha$, $C1\_\beta$, $C1\_\gamma$, $C1\_\delta$, and $C1\_\varepsilon$ correspond to the partial routes $P\_\alpha$, $P\_\beta$, $P\_\gamma$, $P\_\delta$, and $P\_\varepsilon$, respectively.

Next, the route cost calculating unit 25 calculates second partial route cost C2 in each of the partial routes P (step ST15), In FIG. 7A, illustrated is an example of second partial route costs $C2\_\alpha$, $C2\_\beta$, $C2\_\gamma$, $C2\_\delta$, and $C2\_\varepsilon$ calculated by the route cost calculating unit 25. Here, the second partial route costs $C2\_\alpha$, $C2\_\beta$, $C2\_\gamma$, $C2\_\delta$, and $C2\_\varepsilon$ correspond to the partial routes $P\_\alpha$, $P\_\beta$, $P\_\gamma$, $P\_\delta$, and $P\_\varepsilon$, respectively.

In the example illustrated in FIG. 7, a second partial route cost C2 in each of the partial routes P is calculated to be twice the value of the first partial route cost C1 in the corresponding partial route P. This is because, for example the size of the update data after restoration is twice the size of the update data before restoration.

Next, the process cost calculating unit 26 calculates restoration process cost C3 in each of the ECUs 2 (step ST16). In FIG. 7B, illustrated is an example of restoration process costs C3_1, C3_2, C3_3, C3_4, and C3_5 calculated by the process cost calculating unit 26. Here, the restoration process costs C3_1, C3_2, C3_3, C3_4, and C3_5 correspond to the ECUs 2_1, 2_2, 2_3, 2_4, and 2_5, respectively.

Next, the total cost calculating unit 27 calculates transmission route cost C4 for each combination of a restoration execution ECU 2 and a transmission route R on the basis of the partial route costs C1 and C2 calculated by the route cost calculating unit 25 (step ST17). In FIG. 7C, illustrated is an example of transmission route cost C4 in each of five combinations (#1 to #5 in the figure). Note that, for each case where a corresponding one of the five ECUs 2_1, 2_2, 2_3, 2_4, and 2_5 is a restoration execution ECU, only the combination of a transmission route R and the corresponding ECU having the smallest total cost C5 is illustrated in FIG. 7C. That is, the five combinations have a one-to-one correspondence with the five ECUs 2_1, 2_2, 2_3, 2_4, and 2_5.

Next, the total cost: calculating unit 27 calculates the total cost C5 for each combination of a restoration execution ECU 2 and a transmission route R on the basis of the restoration process cost C3 calculated by the process cost calculating unit 26 and the calculated transmission route cost C4. In FIG. 7C, illustrated is an example of the total cost C5 in each of the five combinations (#1 to #5 in the figure).

Next, the combination selecting unit 28 selects a combination that has the smallest total cost C5 among the five combinations. In the example illustrated in FIG. 7C, the fifth combination (#5 in the figure) out of the five combinations is selected.

Next, an instruction signal corresponding to the fifth combination is output. On the basis of the instruction signal that has been output, update data is transmitted through the partial routes P_α, P_β, P_δ sequentially. After the transmission, a restoration process is executed in the ECU 2_5 (that is, the restoration execution ECU). Furthermore, after the transmission, an update process is executed in the ECU 2_5 (that is, the update target ECU).

Next, another specific example of a process by the update setting unit 42 will be described with reference to FIG. 8. Note that it is assumed that the update target ECU is the ECU 2_5.

First, the route cost calculating unit 25 calculates first partial route cost C1 in each of the partial routes P (step ST15). In FIG. 8A, illustrated is an example of first partial route costs C1_α, C1_β, C1_γ, C1_δ, and C1_ε calculated by the route cost calculating unit 25.

Next, the route cost calculating unit 25 calculates second partial route cost C2 in each of the partial routes P (step ST15). In FIG. 8A, illustrated is an example of second partial route costs C2_α, C2_β, C2_γ, C2_δ, and C2_ε calculated by the route cost calculating unit 25.

Next, the process cost calculating unit 26 calculates restoration process cost C3 in each of the ECUs 2 (step ST16), In FIG. 8B, illustrated is an example of restoration process costs C3_1, C3_2, C3_3, C3_4, and C3_5 calculated by the process cost calculating unit 26.

Next, the total cost calculating unit 27 calculates transmission route cost C4 for each combination of a restoration execution ECU 2 and a transmission route R on the basis of the partial route costs C1 and C2 calculated by the route cost calculating unit 25 (step ST17). In FIG. 8C, illustrated is an example of transmission route cost C4 in each of five combinations (#1 to #5 in the figure). Note that, for each case where a corresponding one of the five ECUs 2_1, 2_2, 2_3, 2_4, and 2_5 is a restoration execution ECU, only the combination of a transmission route R and the corresponding ECU having the smallest total cost C5 is illustrated in FIG. 8C, That is, the five combinations have a one-to-one correspondence with the five ECUs 2_1, 2_2, 2_3, 2_4, and 2_5.

Next, the total cost calculating unit 27 calculates the total cost C5 for each combination of a restoration execution ECU 2 and a transmission route R on the basis of the restoration process cost C3 calculated by the process cost calculating unit 26 and the calculated transmission route cost C4. In FIG. 8C, illustrated is an example of the total cost C5 in each of the five combinations (#1 to #5 in the figure).

Next, the combination selecting unit 28 selects a combination that has the smallest total cost C5 among the five combinations. In the example illustrated in FIG. 8C, the fourth combination (#4 in the figure) out of the five combinations is selected.

Next, an instruction signal corresponding to the fourth combination is output. On the basis of the instruction signal that has been output, update data is transmitted through the partial routes P_α, P_β, P_γ, and P_ε sequentially. During the transmission, a restoration process is executed in the ECU 2_4 (that is, the restoration execution ECU). Furthermore, after the transmission, an update process is executed in the ECU 2_5 (that is, the update target ECU).

Here, the example illustrated in FIG. 7 and the example illustrated in FIG. 8 are compared. In the example illustrated in FIG. 8, partial route costs C1_γ, C1_ε, C2_γ, and C2_ε in the partial routes P_γ and P_ε are smaller than those in the example illustrated in FIG. 7, and partial route costs C1_δ and C2_δ in the partial route P_δ are larger. In other words, in the example illustrated in FIG. 7, the partial route costs C1_γ, C1_ε, C2_γ, and C2_ε in the partial routes P_γ and P_ε are larger than those in the example illustrated in FIG. 8, and the partial route costs C1_δ and C2_δ in the partial route P_δ are smaller.

Therefore, in the example illustrated in FIG. 7, except for the case where the ECU 2_4 executes the restoration process (that is, except for the combination of #4 in the figure), a transmission route R that avoids the partial routes P_γ and P_ε, is selected out of the transmission routes R from the communication control ECU 2_1 to the update target ECU 2_5, that is, a transmission route R that includes the partial route P_δ is selected. Furthermore, in this case, the ECU 2_5 is selected as the restoration execution ECU since the total cost C5 is minimized when the ECU 2_5 executes the restoration process.

Meanwhile, in the example illustrated in FIG. 8, a transmission route R that avoids the partial route P_δ is selected out of the transmission routes R from the communication control ECU 2_1 to the update target ECU 2_5, that is, a transmission route R that includes the partial routes P_γ and P_ε is selected. Furthermore, in this case, the ECU 2_4 is selected as the restoration execution ECU since the total cost C5 is minimized when the ECU 2_4 executes the restoration process.

Note that the performance information may include at least one of the processing speed information, the storage capacity information, or the working capacity information. Moreover, the load information may include at least one of the processor usage rate information or the memory usage rate information.

Furthermore, the number of ECUs 2 in the vehicle 1 is, only required to be two or more without being limited to five. In addition, the connection relationship among the plurality of ECUs 2 in the in-vehicle network N1 may be any topology without being limited to the example illustrated in FIG. 2.

In addition, the update management ECU is not limited to the ECU 2_2. Any ECU 2 out of the plurality of ECUs 2 may be set as the update management ECU depending on the above topology.

The load management ECU is also not limited to the ECU 2_3. Any ECU 2 out of the plurality of ECUs 2 may be set as the load management ECU depending on the above topology.

Figure 9:
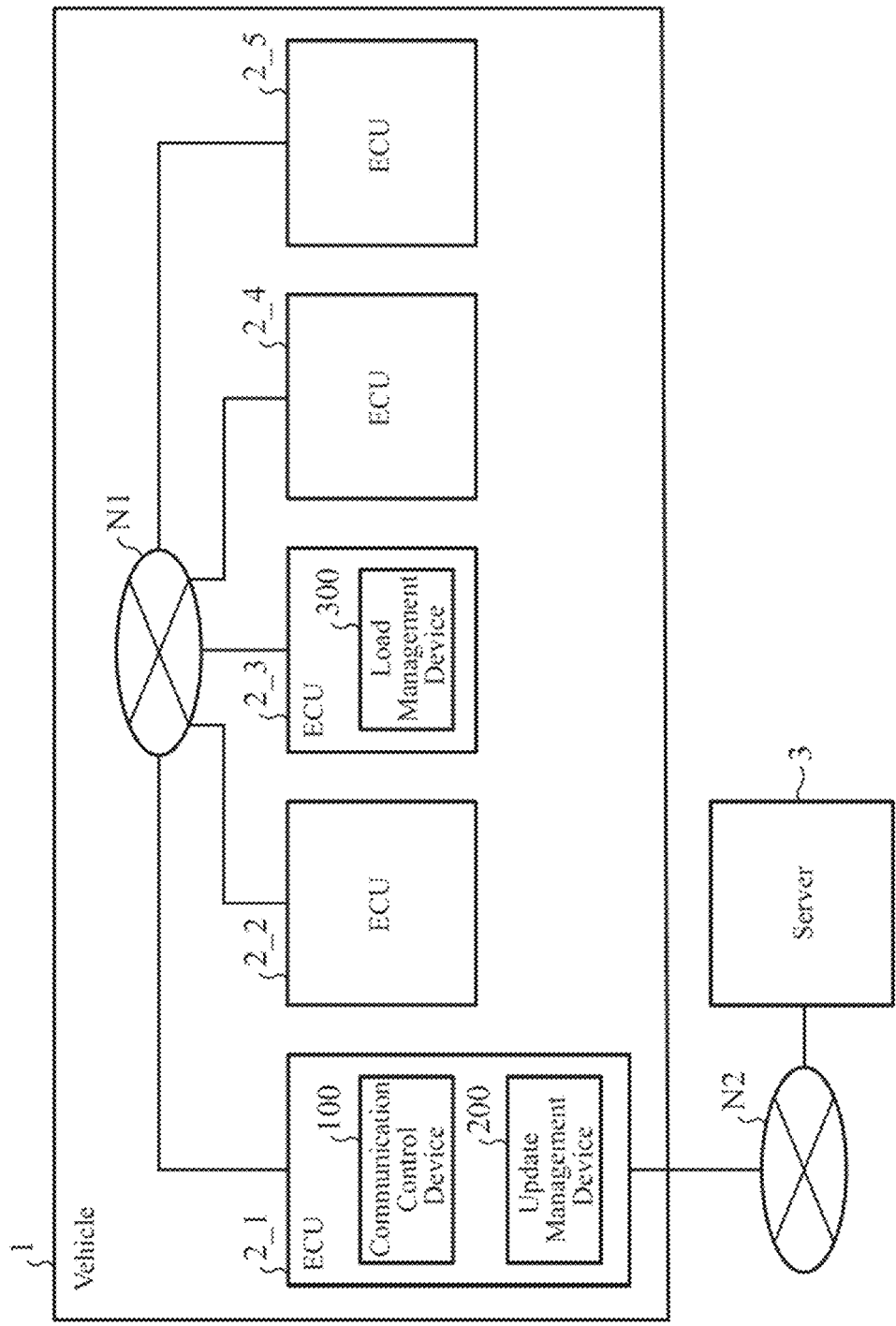
FIG. 9 is an explanatory diagram illustrating another example of a state in which a plurality of ECUs is provided in a vehicle.
Figure 10:
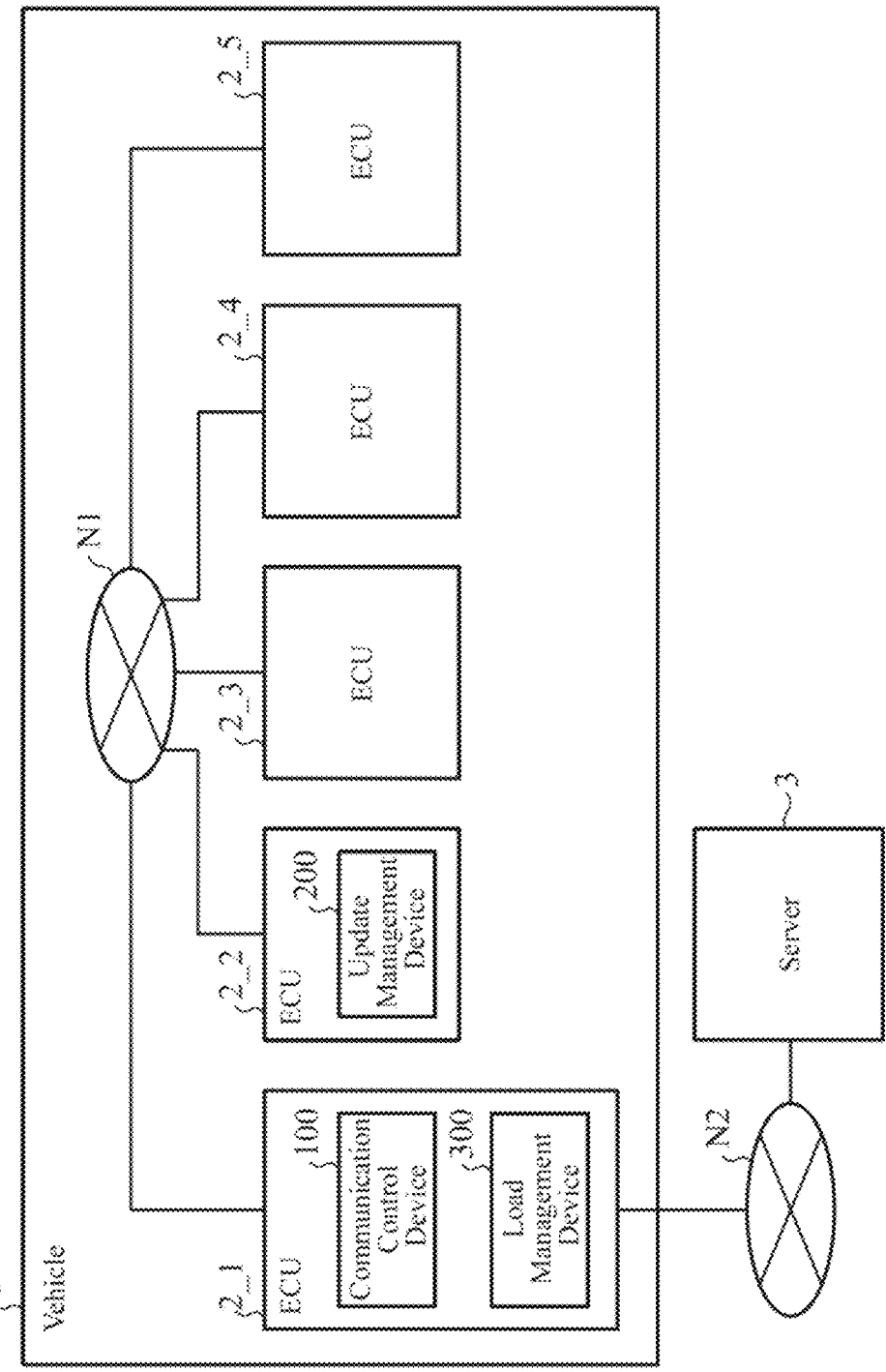
FIG. 10 is an explanatory diagram illustrating another example of a state in which a plurality of ECUs is provided in a vehicle.
Figure 11:
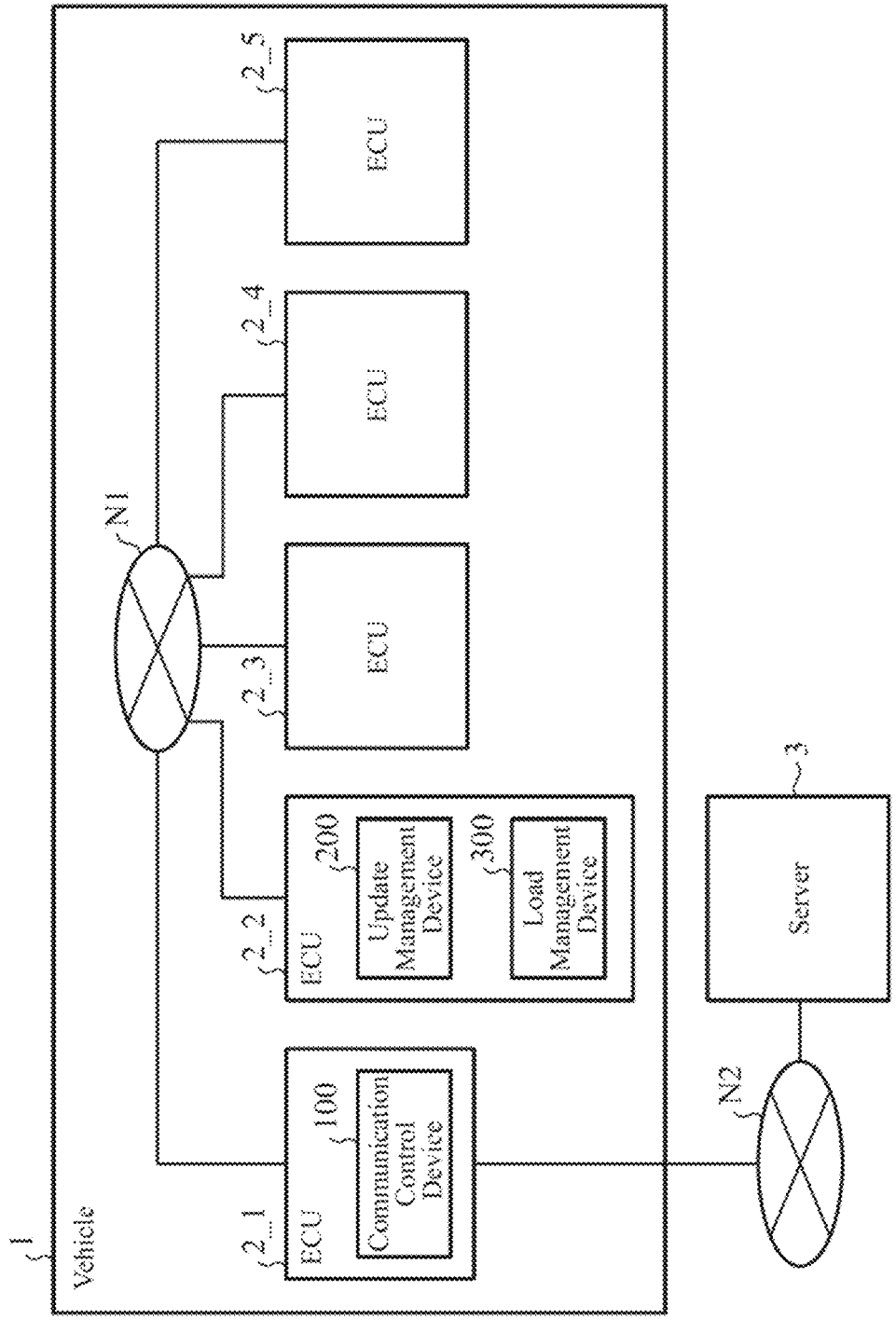
FIG. 11 is an explanatory diagram illustrating another example of a state in which a plurality of ECUs is provided in a vehicle.
Figure 12:
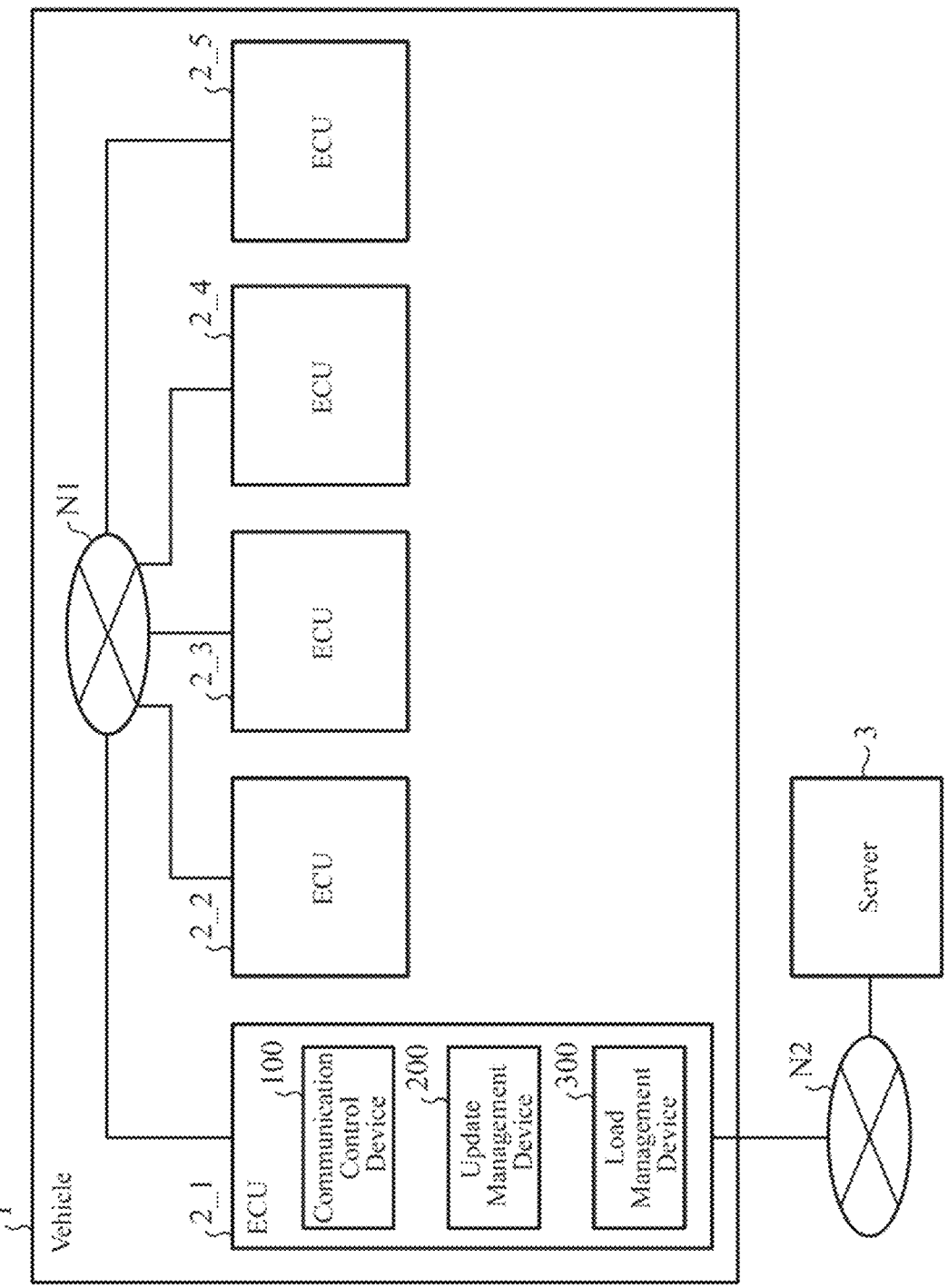
FIG. 12 is an explanatory diagram illustrating another example of a state in which a plurality of ECUs is provided in a vehicle.

Therefore, the communication control device 100 and the update management device 200 may be included in the same ECU 2 depending on the above topology (see, for example, FIG. 9). Moreover, the communication control device 100 and the load management device 300 may be included in the same ECU 2 depending on the above topology (see, for example, FIG. 10). Furthermore, the update management device 200 and the load management device 100 may be included in the same ECU 2 depending on the above topology (see, for example, FIG. 11). In addition, the communication control deice 100, the update management device 200, and the load management device 300 may be provided in the same ECU 2 depending on the above topology (see, for example, FIG. 12).

Moreover, the number of load management ECUs is not limited to one. Any number of ECUs 2 out of the plurality of ECUs 2 may be set as the load management ECU depending on the above topology.

Note that, in a case where the number of load management ECUs is two or more and neither of the two or more ECUs is ECU2 different from the update management ECU, each of the two or more load management ECUs can communicate directly with the update management ECU. Furthermore, in this case, each of the two or more load management ECUs can directly communicate with a plurality of collection target ECUs that corresponds thereto.

That is, the two or more load management ECUs collect dynamic information related to collection target ECU groups different from each other. In addition, the plurality of collection target ECUs included in each of the collection target ECU groups cannot directly communicate with the update management ECU but can directly communicate with the corresponding load management ECU.

Figure 13:
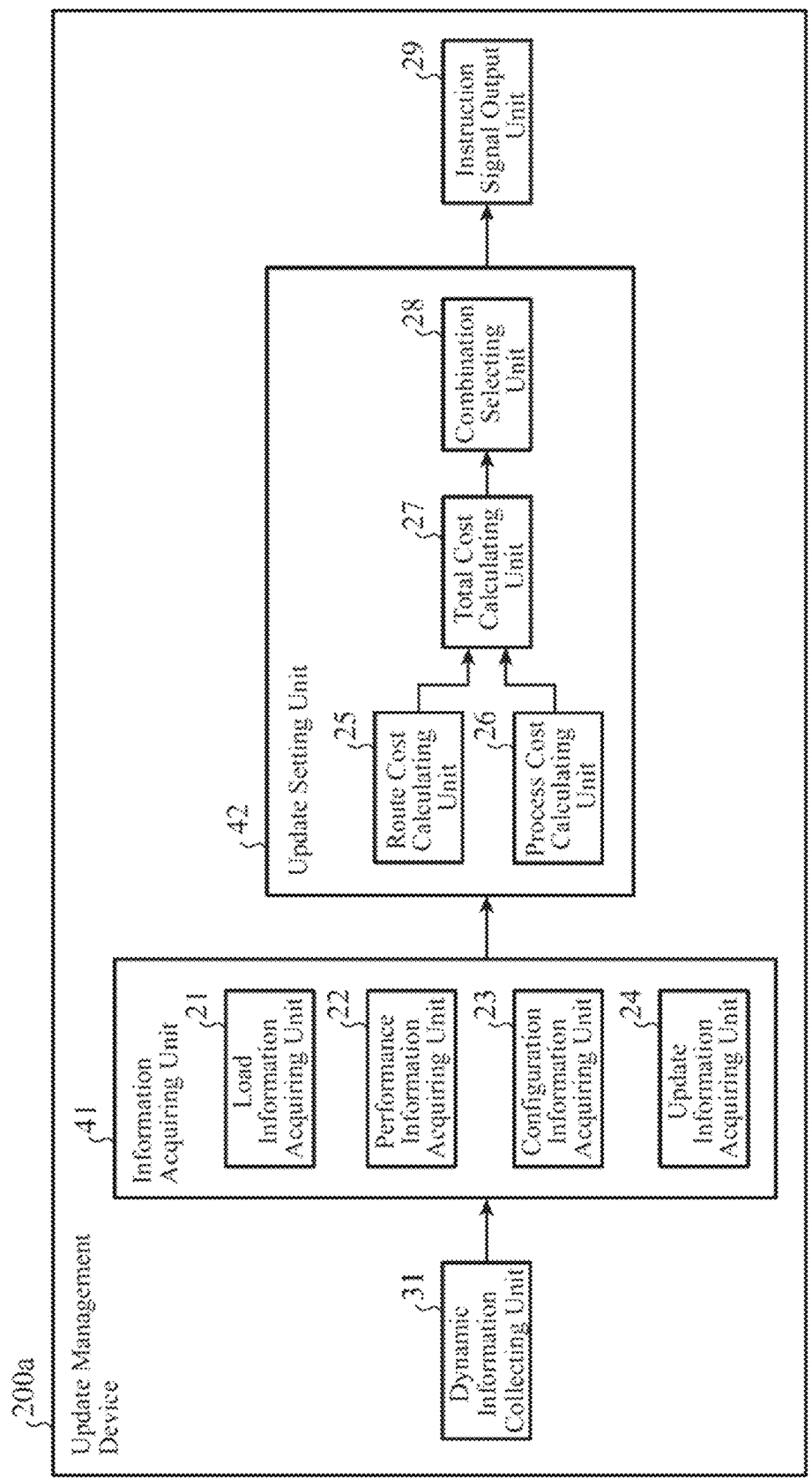
FIG. 13 is a block diagram illustrating the main part of another update management device according to the first embodiment.
Figure 14:
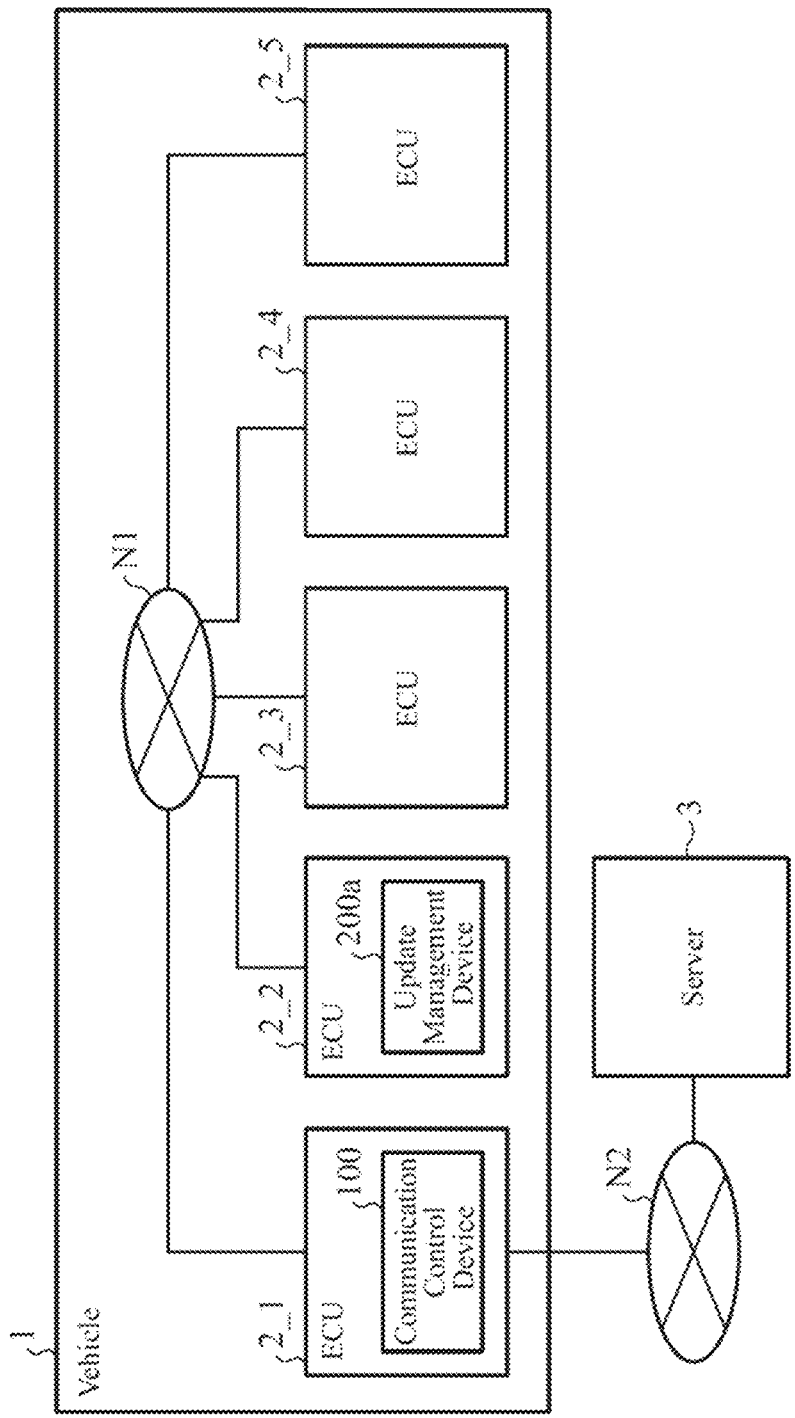
FIG. 14 is an explanatory diagram illustrating another example of a state in which a plurality of ECUs is provided in a vehicle.
Figure 15:
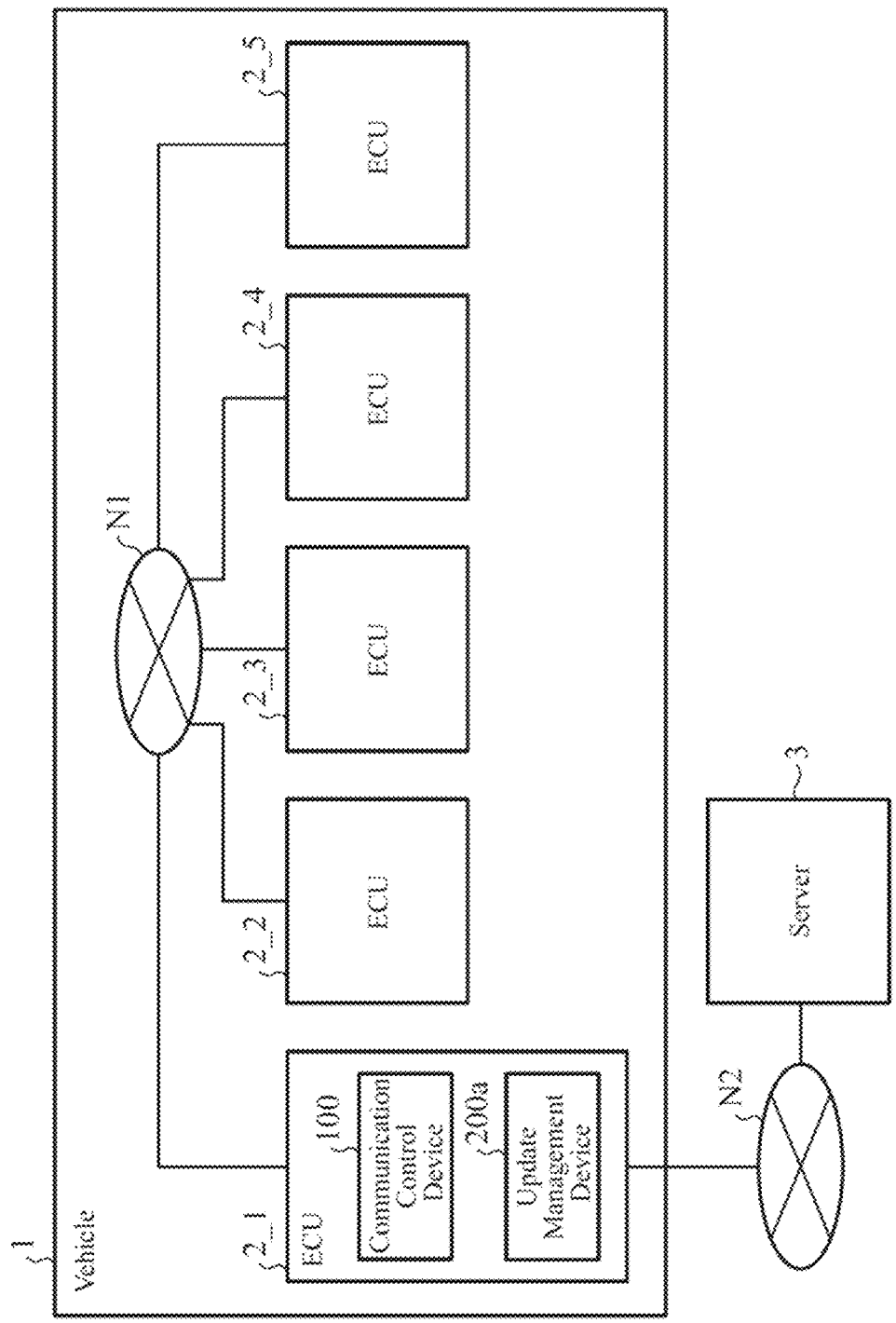
FIG. 15 is an explanatory diagram illustrating another example of a state which a plurality of ECUs is provided in a vehicle.

Furthermore, as illustrated in FIG. 13, the main part of an update management device 200a may include the dynamic information collecting unit 31, the information acquiring unit 41, the update setting unit 42, and the instruction signal output unit 29. The update management device 200a may be included in in ECU 2 different from that of the communication control device 100 depending on the above topology (see, for example, FIG. 14). Alternatively, the update management device 200a may be included in the same ECU 2 as that of the communication control device 100 depending on the above topology (see, for example, FIG. 15).

Furthermore, the instruction signal output unit 29 may be provided outside the update management device 200 or 200a but inside the update management ECU 2. That is, the main part of the update management device 200 may include the information acquiring unit 41 and the update setting unit 42. In addition, the main part of the update management device 200a may include the dynamic information collecting unit 31, the information acquiring unit 41, and the update setting unit 42.

As described above, the update management devices 200 and 200a of the first embodiment each manage software update of the plurality of ECUs 2 included in the in-vehicle network N1, and the update management devices 200 and 200a each include: the information acquiring unit 41 for acquiring load information indicating a load, of each of the plurality of ECUs 2, performance information indicating a performance of each of the plurality of ECUs 2, and configuration information indicating the configuration of the in-vehicle network N1; and the update setting, unit 42 for selecting a restoration execution ECU 2 that executes a restoration process of update data from among the plurality of ECUs 2 using the load information, the performance information, and the configuration information acquired by the information acquiring unit 41. As a result, the restoration execution ECU 2 can be appropriately selected depending on the load of each of the ECUs 2, the performance of each of the ECUs 2, and the configuration of the in-vehicle network N1.

Moreover, the update setting unit 42 selects a transmission route R of the update data in the in-vehicle network N1 using the load information, the performance information, and the configuration information acquired by the information acquiring unit 41. As a result, the transmission route R can be appropriately selected depending on the load of each of the ECUs 2, the performance of each of the ECUs 2, and the configuration of the in-vehicle network N1.

Furthermore, the update setting unit 42 selects the restoration execution ECU 2 and the transmission route R on the basis of the total time of the time required for execution of the restoration process and the time required for transmission of the update data in the in-vehicle network N1. As a result, the total time can be shortened. As a result, it is possible to shorten the time period from completion of reception of the update data and the update information to completion of the update of the update target software.

Furthermore, the load information and the performance information include dynamic information, the update management device 200a includes the dynamic information collecting unit 31 for periodically collecting the dynamic information, and the information acquiring unit 41 acquires the dynamic information collected by the dynamic information collecting unit 31. As a result, it is possible to acquire dynamic information related to ECUs 2 that cannot directly communicate with the update management ECU 2.

Meanwhile, the update management system 400 of the first embodiment manages software update of the plurality of ECUs 2 included in the in-vehicle network N1, and the update management system 400 includes: the information acquiring unit 41 for acquiring load information indicating a load of each of the plurality of ECUs 2, performance information indicating a performance of each of the plurality of ECUs 2, and configuration information indicating the configuration of the in-vehicle network N1; and the update setting unit 42 for selecting a restoration execution ECU 2 that executes a restoration process of update data from among the plurality of ECUs 2 using the load information, the performance information, and the configuration information acquired by the information acquiring unit 41. As a result, similar effects to the above-described effects by the update management devices 200 and 200a can be obtained.

Furthermore, an update management method of the first embodiment is an update management method for managing software update of the plurality of ECUs 2 included in the in-vehicle network N1, and the update management method includes: by the information acquiring unit 41, acquiring load information indicating a load of each of the plurality of ECUs 2, performance information indicating a performance of each of the plurality of ECUs 2, and configuration information indicating the configuration of the in-vehicle network N1; and, by the update setting unit 42, selecting a restoration execution ECU 2 that executes a restoration process of update data from among the plurality of ECUs 2 using the load information, the performance information, and the configuration information acquired by the information acquiring unit 41. As a result, similar effects to the above-described effects by the update management devices 200 and 200a can be obtained.

Note that the present invention may include modification of any component of the embodiment, or omission of any component of the embodiment within the scope of the present invention.

INDUSTRIAL APPLICABILITY

An update management device, an update management system, and an update management method of the present invention can be used for management of software update of a plurality of ECUs in a vehicle.

REFERENCE SIGNS LIST

1: vehicle, 2: electronic control unit (ECU), 3: server, 11: processor, 12: volatile memory, 13: non-volatile memory, 21: load information acquiring unit, 22 performance information acquiring unit, 23: configuration information acquiring unit, 24: update information acquiring unit, 25: route cost calculating unit, 26: process cost calculating unit, 27: total cost calculating unit, 28: combination selecting unit, 29: instruction signal output unit, 31: dynamic information collecting unit, 41: information acquiring unit, 42: update setting unit, 100: communication control device, 200, 200a:

update management device, 300: load management device, 400: update management system. N1: in-vehicle network, N2: external network

The invention claimed is:

1. An update management device for managing software update of a plurality of electronic control units (ECUs) included in an in-vehicle network, the update management device comprising:
    a processor to execute a program; and
    a memory to store the program which, when executed by the processor, performs processes comprising:
        acquiring load information indicating a load of each of the plurality of ECUs, performance information indicating a performance of each of the plurality of ECUs, and configuration information indicating a configuration of the in-vehicle network,
        selecting a restoration execution ECU that executes a restoration process of update data from among the plurality of ECUs based on the load information, the performance information, and the configuration information which are acquired, and
        issuing an instruction signal, wherein the instruction signal is configured to cause the restoration execution ECU to perform the restoration process and to cause an update target ECU to perform an update process.

2. The update management device according to claim 1, wherein the processes further include selecting a transmission route of the update data in the in-vehicle network using the load information, the performance information, and the configuration information which are acquired.

3. The update management device according to claim 2, wherein the processes further include selecting the restoration execution ECU and the transmission route on a basis of total time of time required for execution of the restoration process and time required for transmission of the update data in the in-vehicle network.

4. The update management device according to claim 1,
    wherein the processes further include periodically collecting dynamic information, and
    the load information and the performance information include the dynamic information.

5. The update management device according to claim 1, wherein the performance information includes at least one of information indicating a processing speed of a processor in each of the plurality of ECUs, information indicating a capacity of an area which is included in a non-volatile memory in each of the plurality of ECUs and which can be used for storing the update data, or information indicating a capacity of a volatile memory in each of the plurality of ECUs.

6. The update management device according to claim 1, wherein the load information includes at least one of information indicating a usage rate of a processor in each of the plurality of ECUs or information indicating a usage rate of a volatile memory in each of the plurality of ECUs.

7. The update management device according to claim 1,
    wherein the plurality of ECUs freely communicate with each other via a plurality of partial routes in the in-vehicle network, and
    the configuration information includes information indicating a connection relationship among the plurality of ECUs in the in-vehicle network and information indicating a communication speed assigned to each of the plurality of partial routes.

8. The update management device according to claim 1, wherein the update data includes data to be used for entire update of software of an update target ECU among the plurality of ECUs.

9. The update management device according to claim 1, wherein the update data includes data to be used for differential update of software of the update target ECU among the plurality of ECUs.

10. The update management device according to claim 1, wherein the restoration process includes a process of decompressing the update data in a case where the update data is compressed.

11. The update management device according to claim 1, wherein the restoration process includes a process of decrypting the update data in a case where the update data is encrypted.

12. An update management system for managing software update of a plurality of electronic control units (ECUs) included in an in-vehicle network, the update management system comprising:
    an update target ECU;
    a processor to execute a program; and
    a memory to store the program which, when executed by the processor, performs processes comprising:
        acquiring load information indicating a load of each of the plurality of ECUs, performance information indicating a performance of each of the plurality of ECUs, and configuration information indicating a configuration of the in-vehicle network,
        selecting a restoration execution ECU that executes a restoration process of update data from among the plurality of ECUs using the load information, the performance information, and the configuration information which are acquired, and
        issuing an instruction signal, wherein the instruction signal is configured to cause the restoration execution ECU to perform the restoration process and to cause the update target ECU to perform an update process.

13. The update management system according to claim 12, further comprising:
    a second processor to execute a second program; and
    a second memory to store the second program which, when executed by the second processor, performs a process of periodically collecting dynamic information,
    wherein the load information and the performance information include the dynamic information.

14. The update management system according to claim 13,
    wherein the plurality of ECUs comprises:
        a first ECU configured to function as an update management ECU and perform the processes of acquiring the load information, the performance information, and the configuration information and of selecting the restoration execution ECU,
        a second ECU configured to function as a load management ECU and perform the process of collecting the dynamic information, and
        a third ECU configured to function as a collection target ECU from which the dynamic information is to be collected by the load management ECU, and
    in the in-vehicle network, the update management ECU and the load management ECU can directly communicate with each other, the load management ECU and the collection target ECU can directly communicate with each other, and the update management ECU and the collection target ECU cannot directly communicate with each other.

15. An update management method for managing software update of a plurality of electronic control units (ECUs) included in an in-vehicle network, the update management method comprising:
- acquiring load information indicating a load of each of the plurality of ECUs, performance information indicating a performance of each of the plurality of ECUs, and configuration information indicating a configuration of the in-vehicle network;
- selecting a restoration execution ECU that executes a restoration process of update data from among the plurality of ECUs using the load information, the performance information, and the configuration information which are acquired; and
- issuing an instruction signal, wherein the instruction signal is configured to cause the restoration execution ECU to perform the restoration process and to cause an update target ECU to perform an update process.

16. The update management system of claim 14, wherein the third ECU is the first ECU.

17. The update management system of claim 14, wherein the first ECU is the second ECU.

\* \* \* \* \*